United States Patent

Usuki

(10) Patent No.: US 12,405,614 B2
(45) Date of Patent: Sep. 2, 2025

(54) DEVICE AND METHOD FOR CONTROLLING GLIDE VEHICLE AND FLYING BODY

(71) Applicant: MITSUBISHI HEAVY INDUSTRIES, LTD., Tokyo (JP)

(72) Inventor: Tomoaki Usuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 318 days.

(21) Appl. No.: 17/195,866

(22) Filed: Mar. 9, 2021

(65) Prior Publication Data

US 2021/0349474 A1   Nov. 11, 2021

(30) Foreign Application Priority Data

Mar. 27, 2020   (JP) ................. 2020-058738

(51) Int. Cl.
| | |
|---|---|
| *G05D 1/00* | (2024.01) |
| *B64C 30/00* | (2006.01) |
| *B64G 1/00* | (2006.01) |
| *B64G 1/24* | (2006.01) |
| *B64G 1/62* | (2006.01) |

(52) U.S. Cl.
CPC ........... *G05D 1/0808* (2013.01); *B64G 1/242* (2013.01); *B64G 1/62* (2013.01); *B64C 30/00* (2013.01); *B64G 1/002* (2013.01)

(58) Field of Classification Search
None
See application file for complete search history.

(56) References Cited

U.S. PATENT DOCUMENTS

| | | | |
|---|---|---|---|
| 9,273,943 B1 | 3/2016 | Poulsen | |
| 9,944,410 B1* | 4/2018 | Budd | B64D 5/00 |
| 2007/0187547 A1* | 8/2007 | Kelly | B64B 1/20 |
| | | | 244/7 R |
| 2012/0223191 A1* | 9/2012 | Roberts | B64C 27/24 |
| | | | 244/7 A |
| 2013/0043352 A1* | 2/2013 | Bahn | B64G 1/52 |
| | | | 244/171.1 |
| 2016/0244189 A1* | 8/2016 | Turner | B64G 1/1085 |
| 2017/0313444 A1* | 11/2017 | Keidar | B64G 1/44 |

(Continued)

FOREIGN PATENT DOCUMENTS

| | | | | |
|---|---|---|---|---|
| CN | 110334439 | 10/2019 | | |
| WO | WO-2014021742 A2 * | 2/2014 | | B64C 30/00 |

OTHER PUBLICATIONS

"Falcon HTV-2", Defense Advanced Research Projects Agency (https://www.darpa.mil/about-us/timeline/falcon-htv-2).

(Continued)

*Primary Examiner* — Donald J Wallace
*Assistant Examiner* — Paysun Wu
(74) *Attorney, Agent, or Firm* — Wenderoth, Lind & Ponack, L.L.P.

(57) ABSTRACT

A glide control device includes a communications device configured to communicate with an attitude control device of a glide vehicle; and a processor configured to control the attitude control device. The processor is configured to control the attitude control device to generate a downward lift force when a velocity of the glide vehicle is higher than or equal to a first cosmic velocity.

14 Claims, 13 Drawing Sheets

(56) References Cited

U.S. PATENT DOCUMENTS

2018/0339793 A1* 11/2018 Chaudhary ............ B64G 1/625
2021/0086921 A1* 3/2021 Zhou ..................... B64G 1/244

OTHER PUBLICATIONS

"Falcon Hypersonic Technology Vehicle—HTV-2", Executive Services Directorate (https://www.esd.whs.mil/Portals/54/Documents/FOID/Reading%20Room/DARPA/14-F-0122_DARPA_X-51_DOCUMENTS.pdf).

"Research and Development Vision, Realization of Multi-dimension Integrated Defense Force and its Future, Supporting Documentation, Measures for Stand-off Defense Ability", Aug. 30, 2019, Acquisition, Technology and Logistics Agency of Japan, (https://www.mod.go.jp/atla/soubiseisaku/vision/rd_vision_kaisetsu05.pdf (concise explanation of relevance provided in specification).

Office Action issued Sep. 26, 2023 in Japanese Patent Application No. 2020-058738, with English translation.

\* cited by examiner

DEVICE AND METHOD FOR CONTROLLING GLIDE VEHICLE AND FLYING BODY

CROSS REFERENCE

This application claims priority of Japanese Patent Application No. 2020-058738, filed on Mar. 27, 2020, the disclosure of which is incorporated herein by reference.

TECHNICAL FIELD

The present invention relates to glide control devices, glide vehicles, and flying bodies.

Recently, flying bodies for high velocity movement between two locations on the earth have been researched. For example, a hypersonic glide vehicle, Falcon HTV2, is disclosed in "Falcon HTV-2", Defense Advanced Research Projects Agency, and "Falcon Hypersonic Technology Vehicle—HTV-2", Executive Services Directorate. For operating Falcon HTV-2, a rocket loaded with a hypersonic glide vehicle is launched up to an altitude of 100 km or more, where the rocket releases the hypersonic glide vehicle. The released hypersonic glide vehicle re-enters the atmosphere and glides at hypersonic velocities, for example, Mach 22 to reach a desired destination.

The necessity of researches on gliding missiles configured to glide at supersonic velocities is taught in "Research and Development Vision, Realization of Multi-dimension Integrated Defense Force and its Future, Supporting Documentation, Measures for Stand-off Defense Ability", Aug. 30, 2019, Acquisition, Technology and Logistics Agency of Japan.

BACKGROUND ART

In view of the above-described situations, one of objectives of this disclosure is to provide a glide vehicle configured to reach a target in a short time. Other objectives would be understandable from the following description and explanations of embodiments.

SUMMARY

In one embodiment, a glide control device includes a communications device configured to communicate with an attitude control device of a glide vehicle and a processor configured to control the attitude control device. The processor is configured to control the attitude control device to generate a downward lift force when a velocity of the glide vehicle is higher than or equal to a first cosmic velocity.

In one embodiment, a glide vehicle includes the above-described glide control device and the above-described attitude control device.

In one embodiment, a flying body includes the above-described glide vehicle, a propulsion device configured to accelerate the glide vehicle, and a flight control device. The flight control device is configured to control the propulsion device to achieve a level flight at a release altitude. The flight control device is further configured to release the glide vehicle at the release altitude.

In one embodiment, a non-transitory tangible storage medium stores a glide program which when executed causes a processor to execute a reference altitude calculation module and an attack angle control module. The reference altitude calculation module causes the processor to calculate, based on a velocity of the glide vehicle, a reference altitude at which the glide vehicle should glide. The attack angle control module causes the processor to generate a glide control signal to control an attitude of the glide vehicle based on the reference altitude. The attack angle control module also causes the processor to generate the glide control signal to generate a downward lift force when the velocity of the glide vehicle is higher or equal to a first cosmic velocity.

The above-described embodiments allow the glide vehicle to reach a target in a short time.

DETAILED DESCRIPTION OF PREFERRED EMBODIMENTS

Figure 1:
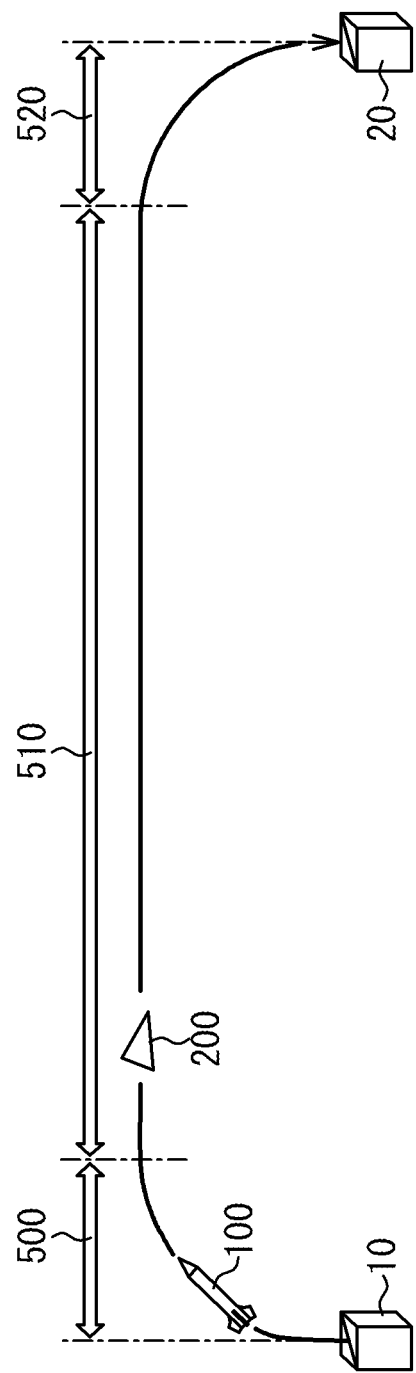
FIG. 1 is a diagram illustrating an overview of a movement of a glide vehicle towards a target, according to one embodiment.

In one embodiment, as illustrated in FIG. 1, a glide vehicle 200 is configured to take off from an on-ground facility 10 and fly toward a target facility 20. The flight of the glide vehicle 200 from the on-ground facility 10 toward the target facility 20 includes a boost phase 500, a glide phase 510, and a terminal phase 520.

During the boost phase 500, the glide vehicle 200 is accelerated by a flying body 100 (e.g., a missile), up to a desired velocity, for example, a velocity higher than or equal to the first cosmic velocity. The flying body 100 establishes a level flight in the atmosphere at a desired altitude at which aerodynamic steering is achievable, for example, at an altitude of 60 km. The glide vehicle 200 is released from a booster 110 after the flying body 100 establishes the level flight, and the procedure goes to the glide phase 510. The glide vehicle 200 may be released in the mesosphere (the region of altitudes from about 80 km to 50 km). It is noted that the term "level flight" referred herein may include a flight in which the angle between the flying direction and the horizontal direction is less than or equal to 10 degrees.

During the glide phase 510, the glide vehicle 200 glides in the atmosphere, for example, in the mesosphere, with aerodynamic steering. The velocity of the glide vehicle 200 may be higher than or equal to the first cosmic velocity at the instance of time when the glide vehicle 200 is released from the booster 110. The glide vehicle 200 goes to the terminal phase 520 when the distance from the target facility 20 becomes less than a desired distance.

During the terminal phase 520, the glide vehicle 200 lowers the altitude and flies toward the target facility 20.

As thus described, the glide vehicle 200 is configured to move from the on-ground facility 10 to the target facility 20 such that the velocity of the glide vehicle 200 is higher than or equal to the first cosmic velocity on at least part of the route.

Figure 2:
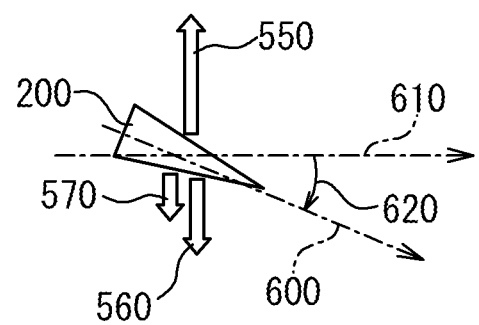
FIG. 2 is a diagram illustrating an overview of a flight of a glide vehicle at a velocity higher than or equal to the first cosmic velocity, according to one embodiment.

As illustrated in FIG. 2, the glide vehicle 200 is configured to produce a downward lift force 570, so-called negative lift force, when the glide vehicle 200 flies at a velocity higher than or equal to the first cosmic velocity. While flying at a velocity higher than or equal to the first cosmic velocity, the glide vehicle 200 receives a centrifugal force 550 larger than the gravity 560 (the force exerted on the glide vehicle 200 by the earth due to the law of universal gravitation). The inventors have found that the glide vehicle 200 can fly in the horizontal direction 610 by producing a lift force 570 in a downward direction (e.g., the gravity direction). Accordingly, in embodiments where the glide vehicle 200 is configured to generate a lift force by controlling the attitude of the glide vehicle 200 or the attitude of part of the glide vehicle 200, a negative lift force is produced by controlling the attitude while the glide vehicle 200 is flying at velocities higher than or equal to the first cosmic velocity. To produce a negative lift force by controlling the attitude of the glide vehicle 200, for example, the forward direction 600 (e.g., the wind chord direction) of the glide vehicle 200 is tilted downward with respect to the flying direction of the glide vehicle 200, e.g., the horizontal direction 610. The glide vehicle 200 is controlled such that the angle of attack (AoA) 602 is tilted downward. The angle of attack 620 is defined as positive when the angle of attack 620 is tilted upward, and as negative when the angle of attack 620 is tilted downward. The angle of attack 620 may be set to a negative value while the glide vehicle 200 is flying at a velocity higher than or equal to the first cosmic velocity.

The velocity of the glide vehicle 200 may decrease due to the drag force during the glide phase 510.

Figure 3:
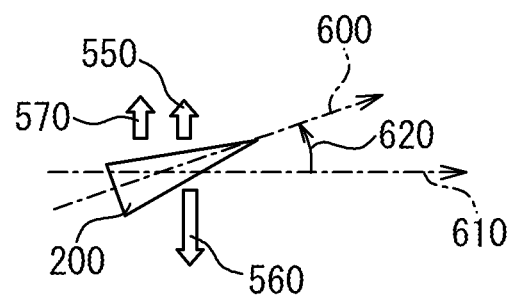
FIG. 3 is a diagram illustrating an overview of a flight of a glide vehicle at a velocity lower than the first cosmic velocity, according to one embodiment.

When the glide vehicle 200 flies at a velocity lower than the first cosmic velocity, the glide vehicle 200 flies such that an upward lift force 570 is produced as illustrated in FIG. 3. While flying at a velocity lower than the first cosmic velocity, the centrifugal force 550 received by the glide vehicle 200 is smaller than the gravity 560. The glide vehicle 200 can fly in the horizontal direction 610 by producing the lift force 570 upward. Accordingly, the forward direction 600 of the glide vehicle 200 is tilted upward with respect to the flying direction of the glide vehicle 200, for example, the horizontal direction 610, when the glide vehicle 200 flies at a velocity lower than the first cosmic velocity. The glide vehicle 200 is controlled such that the angle of attack 620 is tilted upward.

Flying Body Configuration

Figure 4:
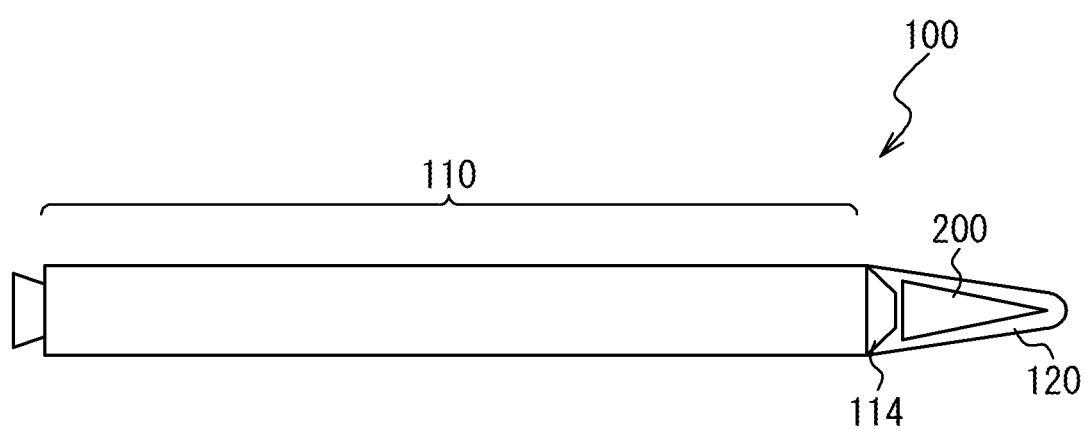
FIG. 4 is a schematic configuration diagram of a flying body, according to one embodiment.

The glide vehicle 200 is loaded in the flying body 100. As illustrated in FIG. 4, the flying body 100 includes a booster 110, a nose faring 120, and the glide vehicle 200. The booster 110 is configured to accelerate the flying body 100 and control the attitude of the flying body 100. For example, the booster 110 may include one or more rocket engines. The booster 110 is configured to accelerate the flying body 100 up to a desired velocity, for example, a velocity higher than or equal to the first cosmic velocity during the boost phase 500.

The nose faring 120 is disposed at the tip of the flying body 100 to cover the glide vehicle 200. The nose faring 120 is configured to protect the glide vehicle 200 from raindrops and the dynamic pressure produced during the boost phase 500.

Figure 5:
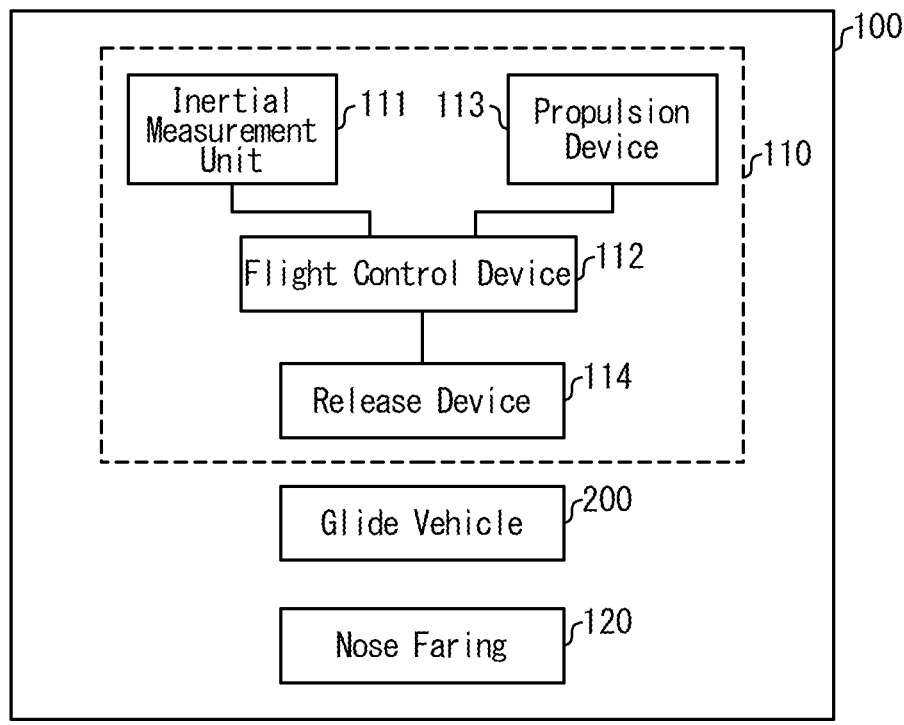
FIG. 5 is a configuration diagram of a device configured to control a flying body, according to one embodiment.

As illustrated in FIG. 5, the booster 110 includes an inertial measurement unit 111, a flight control device 112, a propulsion device 113, and a release device 114.

The release device 114 is configured to detach the nose faring 120 and the glide vehicle 200 from the booster 110 upon the transition from the boost phase 500 to the glide phase 510. The release device 114 may include a spring, for example.

The inertial measurement unit 111 is configured to measure the status of the flying body 100, including the altitude, the flying direction, and the velocity. For example, the inertial measurement unit 111 may include an acceleration sensor, an angular acceleration sensor, and/or the like to measure inertial information of the flying body 100, including the acceleration and the angular acceleration. The status of the flying body 100 (e.g., the altitude, the flying direction, and the velocity) is determined based on the measured inertial information. A signal indicative of the determined status of the flying body 100 is sent to the flight control device 112. The inertial measurement unit 111 may include a receiver receiving a global positioning system (GPS) signal to determine the status of the flying body 100 based on the GPS signal.

Figure 6:
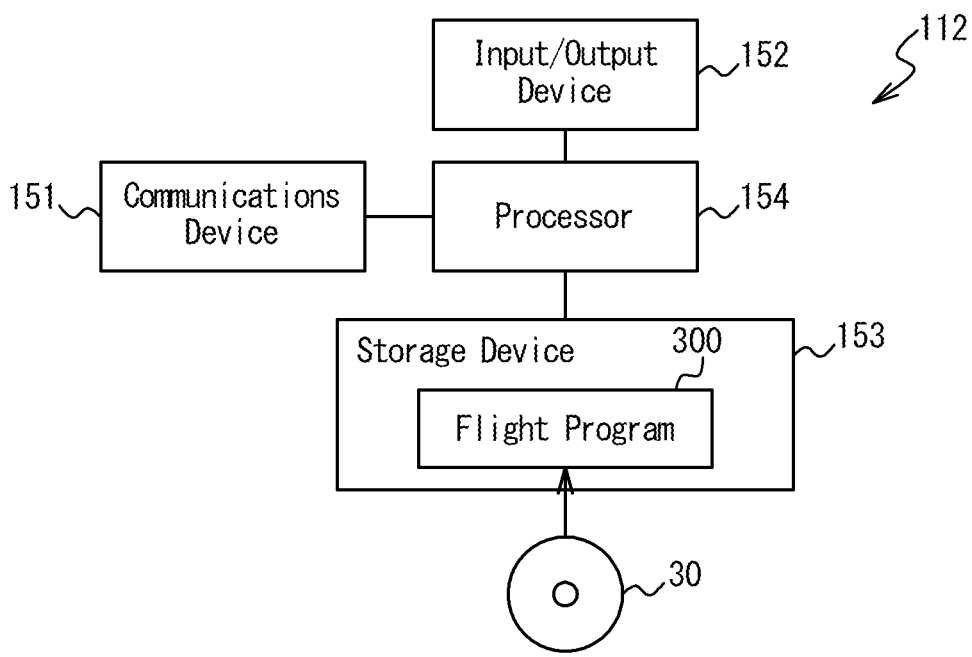
FIG. 6 is a configuration diagram of a flight control device, according to one embodiment.

The flight control device 112 is configured to control the propulsion device 113 and the release device 114 based on the status of the flying body 100 acquired from the inertial measurement unit 111. The flight control device 112 is electrically connected to the inertial measurement unit 111, the propulsion device 113, and the release device 114 with wire or wirelessly and configured to receive the signal indicative of the status of the flying body 100 from the inertial measurement unit 111 and send control signals to the propulsion device 113 and the release device 114. As illustrated in FIG. 6, the flight control device 112 includes a communications device 151, an input/output device 152, a storage device 153, and a processor 154.

The communications device 151 is electrically connected to the inertial measurement unit 111, the propulsion device 113, and the release device 114 and configured to communicate with these devices. The communications device 151 is configured to forward data received from the inertial measurement unit 111 to the processor 154. The communications device 151 is further configured to forward signals generated by the processor 154 to the propulsion device 113 and the release device 114. The communications device 151 may include various interfaces, such as a network interface card (NIC) and a universal serial bus (USB).

The input/output device 152 is configured to receive information used for processing performed by the processor 154. The input/output device 152 is further configured to output the result of the processing performed by the processor 154. The input/output device 152 may include various input devices and output devices, for example, a keyboard, a mouse, a microphone, a display, a speaker, a touch panel, and the like. The input/output device 152 may be omitted.

The storage device 153 is configured to store various data for controlling the propulsion device 113 and the release device 114, including a flight program 300. The storage device 153 is used as a non-transitory tangible storage medium that stores the flight program 300. The flight program 300 may be provided in the form of a computer program product recorded on a computer-readable storage medium 30 or in the form of a computer program product downloadable from a server.

The processor 154 is configured to perform various data processes to control the propulsion device 113 and the release device 114. The processor 154 is configured to read out the flight program 300 from the storage device 153 and execute the flight program 300 to generate control signals for controlling the propulsion device 113 and the release device 114. The processor 154 may include, for example, a central processing unit (CPU) or the like.

Glide Vehicle Configuration

Figure 7:
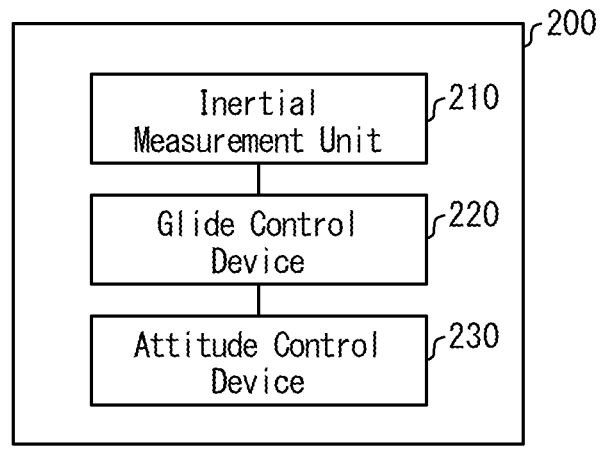
FIG. 7 is a configuration diagram of a glide vehicle, according to one embodiment.

The glide vehicle 200 includes a heat-resistant structure tolerant of aerodynamic heating caused by a flight at the first cosmic velocity in the atmosphere, for example, in the mesosphere. As illustrated in FIG. 7, the glide vehicle 200 includes an inertial measurement unit 210, a glide control device 220, and an attitude control device 230.

The inertial measurement unit 210 is configured to measure the location, velocity, and altitude of the glide vehicle 200. The inertial measurement unit 210 is configured to send a signal indicative of the velocity and altitude of the glide vehicle 200 to the glide control device 220. The inertial measurement unit 210 may include an acceleration sensor, an angular acceleration sensor, and/or the like. The inertial measurement unit 210 may be configured to determine the velocity of the glide vehicle 200 based on the acceleration measured by the acceleration sensor and the angular acceleration measured by the angular acceleration sensor. In such embodiments, the inertial measurement unit 210 is configured to determine the velocity of the glide vehicle 200 based on the history of the measured accelerations and angular accelerations.

The inertial measurement unit 210 may be further configured to determine the altitude of the glide vehicle 200 based on the acceleration measured by the acceleration sensor and the angular acceleration measured by the angular acceleration sensor. In such embodiments, the inertial measurement unit 210 is configured to determine the altitude of the glide vehicle 200 based on the history of the measured accelerations and angular accelerations.

The attitude control device 230 is configured to control the attitude of the glide vehicle 200. The attitude control device 230 may be configured to control, for example, the angle of attack 620 of the glide vehicle 200.

Figure 8:
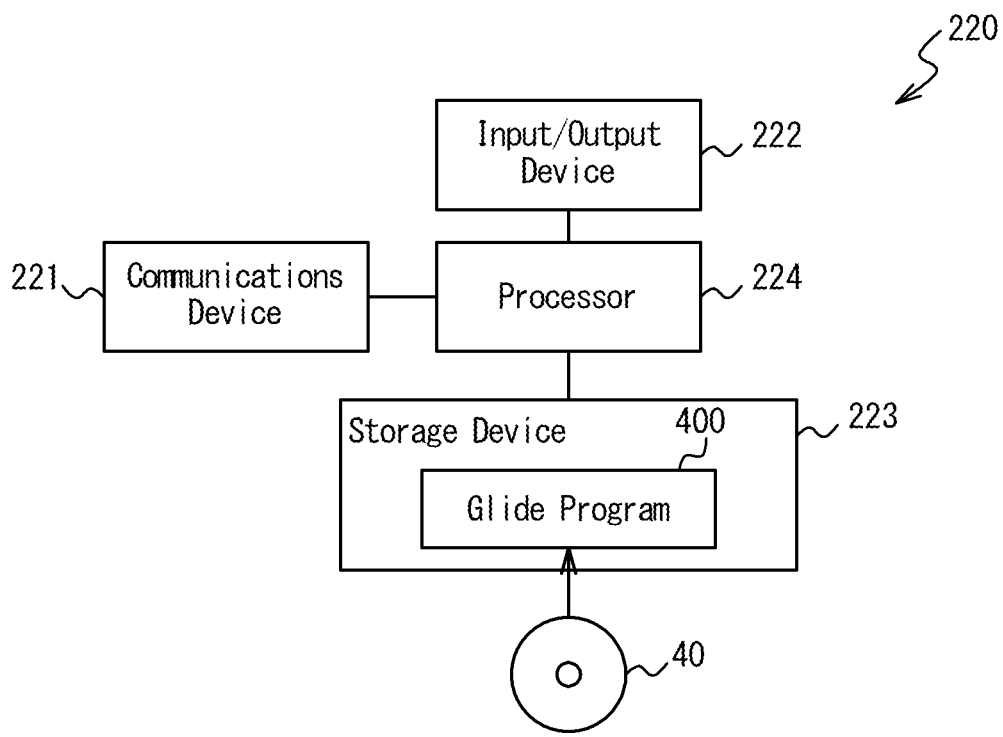
FIG. 8 is a configuration diagram of a glide control device, according to one embodiment.

The glide control device 220 is configured to control the attitude control device 230 based on the altitude and velocity of the glide vehicle 200 acquired from the inertial measurement unit 210. The glide control device 220 is electrically connected to the inertial measurement unit 210 and the attitude control device 230 with wire or wirelessly and configured to receive the signal indicative of the altitude and velocity of the glide vehicle 200 from the inertial measurement unit 210 and send a control signal to the attitude control device 230. As illustrated in FIG. 8, the glide control device 220 includes a communications device 221, an input/output device 222, a storage device 223, and a processor 224.

The communications device 221 is electrically connected to the inertial measurement unit 210 and the attitude control device 230 and configured to communicate with these devices. The communications device 221 is configured to forward data received from the inertial measurement unit 210 to the processor 224. The communications device 221 is further configured to forward a signal generated by the processor 224 to the attitude control device 230. The communications device 221 may include various interfaces, such as a network interface card (NIC) and a universal serial bus (USB).

The input/output device 222 is configured to receive information used for processing performed by the processor 224. The input/output device 222 is further configured to output the result of the processing performed by the processor 224. The input/output device 222 may include various input devices and output devices, for example, a keyboard, a mouse, a microphone, a display, a speaker, a touch panel, and the like. The input/output device 222 may be omitted.

The storage device 223 is configured to store various data for controlling the attitude control device 230 of the glide vehicle 200, including a glide program 400. The storage device 223 is used as a non-transitory tangible storage medium that stores the glide program 400. The glide program 400 may be provided in the form of a computer program product recorded on a computer-readable storage medium 40 or in the form of a computer program product downloadable from a server. A single storage medium may be commonly used as the storage medium 30 and the storage medium 40.

The processor 224 is configured to perform various data processes to control the attitude control device 230 of the glide vehicle 200. The processor 224 is configured to read out the glide program 400 from the storage device 223 and execute the glide program 400 to generate a control signal for controlling the attitude control device 230. The processor 224 may include, for example, a central processing unit (CPU) or the like.

Figure 9:
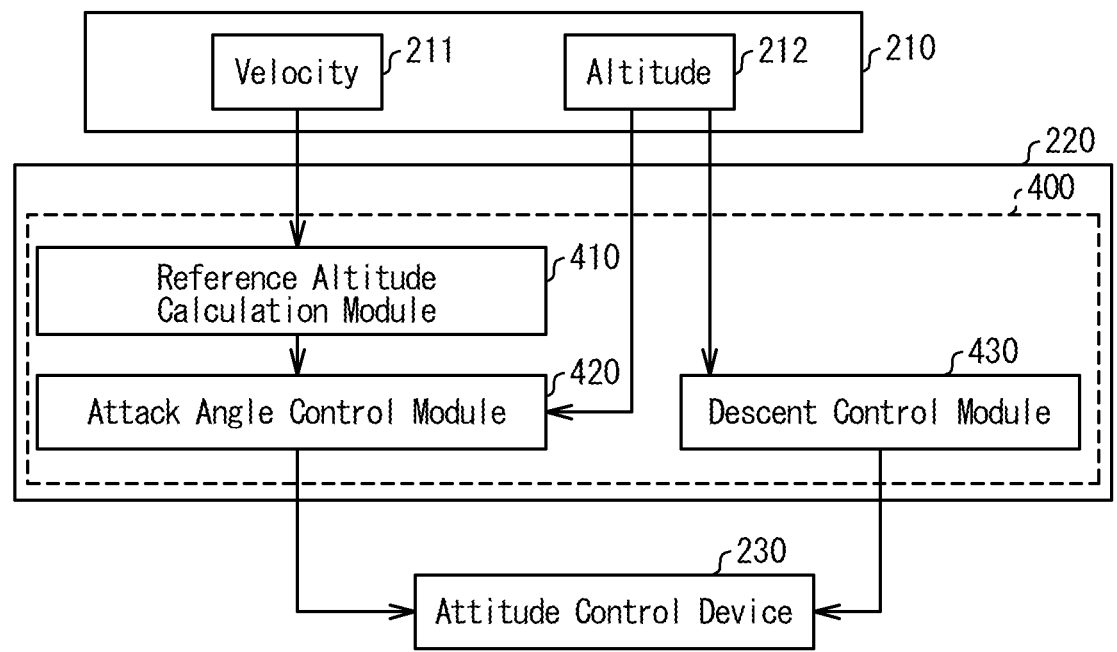
FIG. 9 is a configuration diagram of a glide program, according to one embodiment.

The processor 224 is configured to, by executing the glide program 400, generate an attitude control signal that controls the attitude control device 230 such that a lift force 570 is produced downward, for example, in the gravity direction, when the velocity of the glide vehicle 200 is higher than or equal to the first cosmic velocity. As illustrated in FIG. 9, the glide program 400 includes a reference altitude calculation module 410, an attack angle control module 420, and a descent control module 430.

The processor 224 is configured to execute the reference altitude calculation module 410 and thereby calculate, based on the velocity 211 of the glide vehicle 200, a reference altitude at which the glide vehicle 200 should fly. The velocity 211 of the glide vehicle 200 is acquired from the inertial measurement unit 210.

The processor 224 is configured to execute the attack angle control module 420 and thereby generate the attitude control signal for controlling the attitude control device 230 based on the altitude 212 of the glide vehicle 200 and the reference altitude calculated through the execution of the reference altitude calculation module 410. The altitude 212 of the glide vehicle 200 is acquired from the inertial measurement unit 210. The processor 224 is configured to determine the angle of attack 620 of the glide vehicle 200 based on the altitude 212 of the glide vehicle 200 and the determined reference altitude. The processor 224 is further configured to generate the attitude control signal based on the determined angle of attack 620.

The processor 224 is further configured to cause the glide vehicle 200 to fly toward the target facility 20 by executing the descent control module 430. The processor 224 is configured to control the attitude control device 230 to lower the altitude of the glide vehicle 200 when the glide vehicle 200 gets close to the target facility 20. The attitude control device 230 is configured to guide the glide vehicle 200 to the target facility 20 under the control of the processor 224.

Operation of Flight Control Device

The processor 154 of the flight control device 112 is configured to execute the flight program 300 when the flying body 100 takes off the on-ground facility 10. The flight program 300 causes the processor 154 to perform the procedure illustrated in FIG. 10. The processor 154 is configured to control the flying body 100 during the boost phase 500 by using the flight program 300.

At step S110, the processor 154 controls the propulsion device 113 to cause the flying body 100 to take off and accelerate the velocity. The propulsion device 113 is controlled such that the flying body 100 achieves a level flight at an altitude at which the glide vehicle 200 is released (hereinafter, referred to as "release altitude".) The release altitude may be 30 km or higher, for example. The release altitude may be 50 km or higher. In other embodiments, the release altitude may be 60 km or higher. The release altitude may be 100 km or lower. In other embodiments, the release altitude may be 80 km or lower.

At step S120, the processor 154 determines whether the flying body 100 reaches the release altitude. The altitude of the flying body 100 is determined by the inertial measurement unit 111. The processor 154 acquires the altitude of the flying body 100 from the inertial measurement unit 111. When the acquired altitude of the flying body 100 is lower than the release altitude (NO at step 120), the processor 154 waits for the flying body 100 to reach the release altitude. When the acquired altitude of the flying body 100 becomes higher than or equal to the release altitude (YES at step S120), the processor 154 proceeds with the process of step S130.

At step S130, the processor 154 generates a nose faring detachment signal to detach the nose faring 120. The release device 114 detaches the nose faring 120 based on the nose faring detachment signal.

Figure 11:
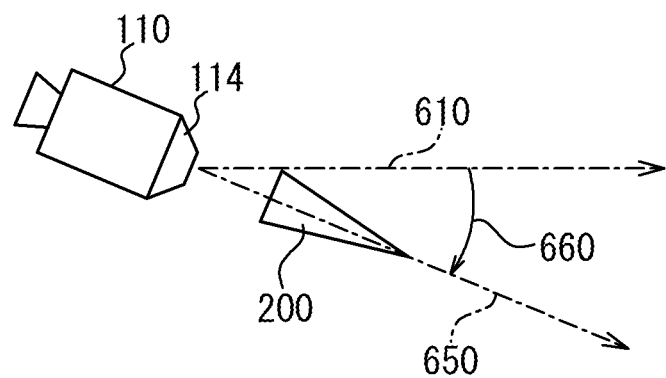
FIG. 11 is a diagram illustrating the direction in which a glide vehicle is ejected from a flying body, according to one embodiment.

At step S140, the processor 154 controls the release device 114 to eject the glide vehicle 200. The processor 154 generates an ejection signal that requests an ejection of the glide vehicle 200. The release device 114 ejects the glide vehicle 200 based on the ejection signal. For example, when releasing the glide vehicle 200, the flying body 100 ejects the glide vehicle 200 while flying in an ejection direction 650 tilted downward by a flight-path angle 660 with respect to the horizontal direction 610, as illustrated in FIG. 11. The angle of attack 620 of the glide vehicle 200 may be arbitrarily selected immediately after the ejection. The angle of attack 620 may be 0 degrees, for example.

Figure 12:
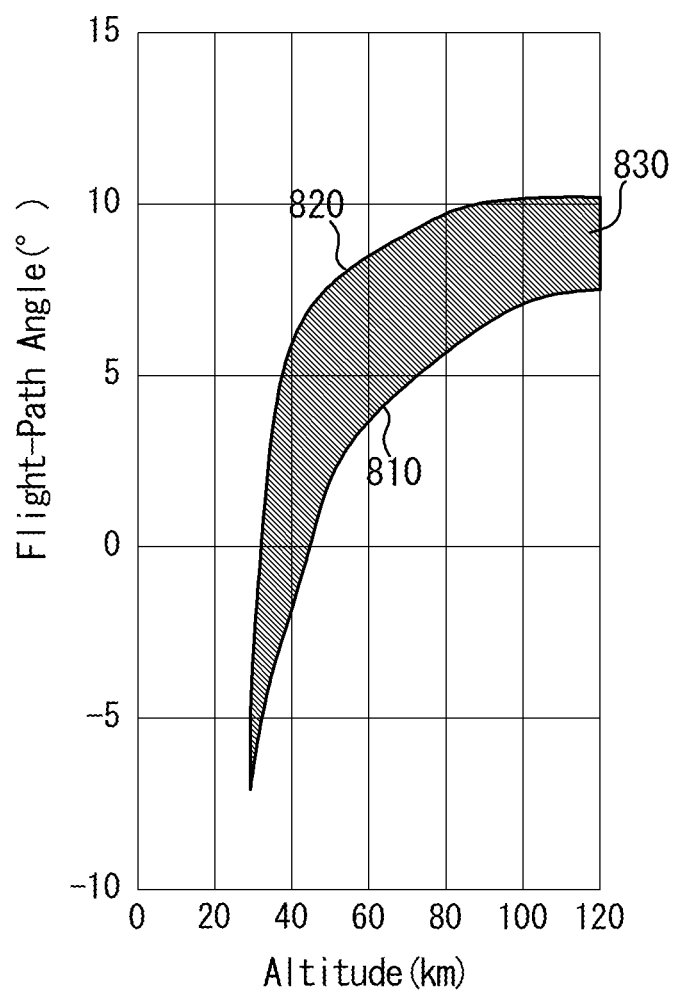
FIG. 12 is a graph illustrating a relation between an altitude at which a glide vehicle is ejected and a flight-path angle, according to one embodiment.

As illustrated in FIG. 12, the ejection direction 650 in which the glide vehicle 200 is ejected is determined depending on the release altitude. The flight-path angle 660, which is the angle between the ejection direction 650 and the horizontal direction 610, falls in a flight-path angle range 830 between a minimum flight-path angle 810 and a maximum flight-path angle 820. The minimum flight-path angle 810 is the minimum value of the flight-path angle 660 that allows the glide vehicle 200 to glide in the atmosphere. When the flight-path angle 660 is smaller than the minimum flight-path angle 810, the glide vehicle 200 may get rid of the atmosphere. The maximum flight-path angle 820 is the maximum value of the flight-path angle 660 that allows the glide vehicle 200 to fly over a desired distance. When the flight-path angle 660 is larger than the maximum flight-path angle 820, the glide vehicle 200 may be decelerated, which may make it impossible to fly over the desired distance.

The minimum flight-path angle 810 monotonically increases as the altitude increases. The function that represents the correlation of the minimum flight-path angle 810 with the altitude may include a convex upward function defined such that the increase rate of the minimum flight-path angle 810 decreases as the altitude increases.

The maximum flight-path angle 820 also monotonically increases as the altitude increases as is the case with the minimum flight-path angle 810. The function that represents the correlation of the maximum flight-path angle 820 with the altitude may include a convex upward function defined such that the increase rate of the maximum flight-path angle 820 decreases as the altitude increases.

The release altitude and the ejection direction 650 may be determined based on the velocity of the flying body 100 at the instance of time when the glide vehicle 200 is released. The flight-path angle range 830 may be determined based on the velocity of the flying body 100 at the instance of time when the glide vehicle 200 is released. For example, for a fixed release altitude, the lower limit and/or the upper limit of the flight-path angle range 830 may increase as the velocity of the glide vehicle 200 increases. When the velocity of the glide vehicle 200 at the instance of time when the glide vehicle 200 is 15 km per second, as illustrated in FIG. 12, the flight-path angle range 830 is, for example, larger than or equal to −7 degrees. The flight-path angle range 830 may be smaller than or equal to 10 degrees. For release altitudes of 40 km or higher, the flight-path angle range 830 may be larger than or equal to −3 degrees. For release altitudes of 50 km or higher, the flight-path angle range 830 may be larger than or equal to 1 degree. For release altitudes of 60 km or higher, the flight-path angle range 830 may be larger than or equal to 3 degrees. For release altitudes of 80 km or lower, the flight-path angle range 830 may be smaller than or equal to 9 degrees. The combination of the release altitude and the ejection direction 650 may be selected such that the flight-path angle falls in the flight-path angle range 830.

As discussed above, the processor 154 of the flight control device 112 allows releasing the glide vehicle 200 in the atmosphere by executing the flight program 300. The velocity of the flying body 100 may be higher than or equal to the first cosmic velocity at the instance of time when the glide vehicle 200 is released. The glide vehicle 200 can reach the target facility 20 in a short time since the glide vehicle 200 can be released in the atmosphere when the flying body 100 is flying at a velocity higher than or equal to the first cosmic velocity.

Operation of Glide Control Device

Figure 13:
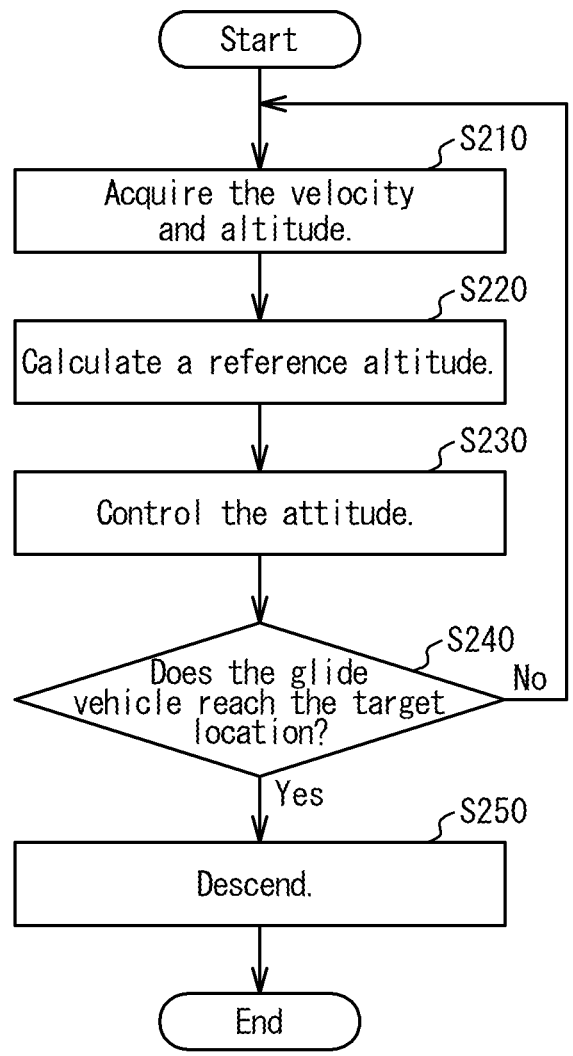
FIG. 13 is a flowchart illustrating a process performed in accordance with a glide program, according to one embodiment.

The processor 224 of the glide control device 220 is configured to execute the glide program 400 when the glide vehicle 200 is released from the booster 110. The glide program 400 is configured to cause the processor 224 to perform the procedure illustrated in FIG. 13. The processor 224 is configured to control the glide vehicle 200 during the glide phase 510 and the terminal phase 520 in accordance with the glide program 400.

At step S210, the processor 224 acquires the current velocity and altitude of the glide vehicle 200. The current velocity and altitude of the glide vehicle 200 are measured by the inertial measurement unit 210. The processor 224 acquires the current velocity and altitude of the glide vehicle 200 from the inertial measurement unit 210.

At step S220, the processor 224 determines, based on the current velocity of the glide vehicle 200, a reference altitude at which the glide vehicle 200 should glide. As illustrated in FIG. 12, the reference altitude may be represented as a function of the current velocity of the glide vehicle 200. For example, the reference altitude may be determined such that the gravity 560, the lift force 570, and the centrifugal force 550 exerted on the glide vehicle 200 are balanced in the vertical direction (e.g., the gravity direction). The reference altitude may be determined such that the lift-drag ratio of the glide vehicle 200 becomes maximum. Details of the reference altitude will be described later.

At step S230, the processor 224 controls the attitude control device 230 such that the glide vehicle 200 glides at the reference altitude. The processor 224 compares the current altitude of the glide vehicle 200 acquired from the inertial measurement unit 210 with the reference altitude. Based on the comparison between the current altitude and the reference altitude, the processor 224 generates an attitude control signal to control the attitude control device 230. When the current altitude is higher than the reference altitude, for example, the processor 224 controls the attitude control device 230 to decrease the angle of attack 620. When the current altitude is lower than the reference altitude, the processor 224 controls the attitude control device 230 to increase the angle of attack 620. Accordingly, when the glide vehicle 200 glides at a velocity higher than the first cosmic velocity, the processor 224 controls the attitude control device 230 to decrease the angle of attack 620 such that a negative lift force is produced, since the altitude of the glide vehicle 200 will increase as the angle of attack 620 increases. The processor 224 may control the attitude control device 230 based on a proportional-differential (PD) control using the current altitude and the reference altitude. The processor 224 may control the attitude control device 230 based on the angle of attack 620 that achieves the maximum lift-drag ratio, when the calculated angle of attack 620 is larger than the angle of attack 620 that achieves the maximum lift-drag ratio. For example, when the calculated angle of attack 620 is larger than the angle of attack 620 that achieves the maximum lift-drag ratio, the processor 224 may control the attitude control device 230 such that the angle of attack 620 of the glide vehicle 200 is adjusted to achieve the maximum lift-drag ratio.

At step S240, the processor 224 determines whether the glide vehicle 200 reaches a target location at which the glide vehicle 200 starts to descend toward the target facility 20. The processor 224 compares the location of the glide vehicle 200 with the target location. The processor 224 may determine that the glide vehicle 200 reaches the target location, when the distance between the location of the glide vehicle 200 and the target location is less than a desired value. The target location may be defined as a region in which the distance from the target facility 20 is less than a desired distance. In such embodiments, the processor 224 may determine that the glide vehicle 200 reaches the target location, when the location of the glide vehicle 200 falls in the region corresponding to the target location. When the glide vehicle 200 does not reach the target location (NO at step S240), the processor 224 performs the process of step S210 and repeats steps S210 to S240 until the glide vehicle 200 reaches the target location. When the glide vehicle 200 reaches the target location (YES at step S240), the processor 224 performs the process of step S250.

The processor 224 acquires the location of the glide vehicle 200 from the inertial measurement unit 210. The inertial measurement unit 210 may include, for example, an acceleration sensor, an angular acceleration sensor, and the like and may be configured to determine the location of the glide vehicle 200 based on the history of the accelerations measured by the acceleration sensor and the history of the angular accelerations measured by the angular acceleration sensor.

At step S250, to go to the terminal phase 520, the processor 224 controls the attitude control device 230 to reduce the altitude of the glide vehicle 200 toward the target facility 20. For example, the processor 224 may generate the attitude control signal to decrease the angle of attack 620 such that a negative lift force is exerted on the glide vehicle 200. The glide vehicle 200 starts to descend as the attitude control device 230 decreases the angle of attack 620 based on the attitude control signal. The processor 224 controls the attitude control device 230 such that the glide vehicle 200 reaches the target facility 20. The method to cause the glide vehicle 200 to descend toward the target facility 20 may be arbitrarily selected.

As thus described, the processor 224 of the glide control device 220 allows the glide vehicle 200 to fly in the atmosphere even when the velocity of the glide vehicle 200 is higher than or equal to the first cosmic velocity. Accordingly, the glide vehicle 200 can reach the target facility 20 in a short time. The glide vehicle 200 may lack a device to produce propulsion to accelerate in the flying direction during the glide phase 510. It is noted that the reference altitude calculation module 410 causes the processor 224 to perform the processes of steps S210 and S220. The attack angle control module 420 causes the processor 224 to perform the process of step S230. The descent control module 430 causes the processor 224 to perform the processes of steps S240 and S250.

Reference Altitude

Figure 14:
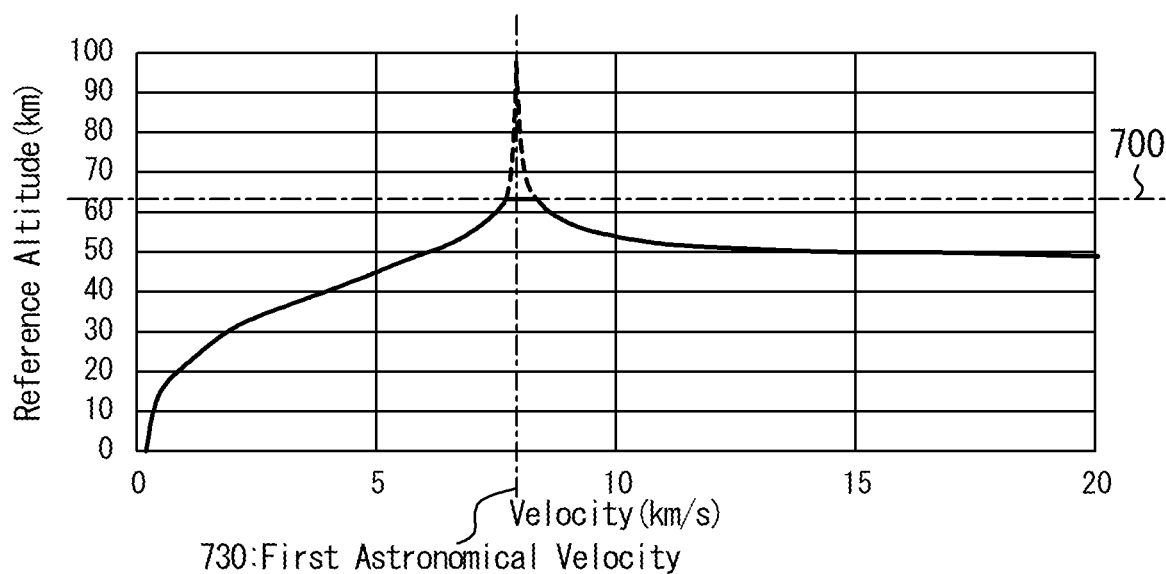
FIG. 14 is a graph illustrating a relation between the velocity of a glide vehicle and a reference altitude, according to one embodiment.

As illustrated in FIG. 14, for velocities of the glide vehicle 200 lower than the first cosmic velocity 730, the function representing the correlation of the reference altitude with the velocity of the glide vehicle 200 may be a weakly monotonically increasing function. For velocities of the glide vehicle 200 higher than the first cosmic velocity 730, the function representing the correlation of the reference altitude with the velocity of the glide vehicle 200 may be a weakly monotonically decreasing function. For velocities of the glide vehicle 200 higher than the first cosmic velocity 730, the function representing the correlation of the reference altitude with the velocity of the glide vehicle 200 may be a convex downward function for which the decrease rate decreases as the velocity of the glide vehicle 200 increases.

An altitude upper limit value 700 may be determined for the reference altitude. The reference altitude may be determined as the altitude upper limit value 700 when the calculated reference altitude is higher than the altitude upper limit value 700. The altitude upper limit value 700 may be an altitude that falls in the mesosphere. The altitude upper limit value 700 may be higher than or equal to 50 km. The altitude upper limit value 700 may be higher than or equal to 60 km. The altitude upper limit value 700 may be lower than or equal to 80 km. The altitude upper limit value 700 may be lower than or equal to 70 km.

The reference altitude may be calculated in view of the fact that the gravity 560, the lift force 570, and the centrifugal force 550 exerted on the glide vehicle 200 are balanced in the vertical direction. The reference altitude may be calculated, for example, in accordance with the following expression (1):

$$h = KH_e \ln\left(\frac{\rho_0 R_e}{\beta_m} L/D_{max} \left|\frac{V^2}{V_e^2 - V^2}\right|\right), \quad (1)$$

where h is the reference altitude; K is the correction factor; $H_e$ is the scale height of the earth used to calculate the density of the atmospheric air; $\rho_0$ is the air density at an altitude of 0 m; Re is the earth radius; $\beta_m$ is the ballistic coefficient; $V_e$ is the first cosmic velocity 730; and $L/D_{max}$ is the maximum lift-drag ratio of the glide vehicle 200.

A description is given below of how the expression (1) is derived. Taking account of a negative lift force, since the lift force 570 is balanced with the resultant of the gravity 560 and the centrifugal force 550, the lift force 570 exerted on the glide vehicle 200 is approximately represented by the following expression (2):

$$L = \left|mg - \frac{mV^2}{R_e}\right|, \quad (2)$$

where L is the lift force 570 of the glide vehicle 200; m is the mass of the glide vehicle 200; g is the acceleration of gravity; and V is the velocity of the glide vehicle 200.

The lift force 570 of the glide vehicle 200 is calculated in accordance with the following expression (3):

$$L = \frac{1}{2}\rho V^2 S C_L, \quad (3)$$

where $\rho$ is the air density; S is the area of the member (e.g. a wing) that produces the lift force 570; and $C_L$ is the lift coefficient of the glide vehicle 200.

According to "Dynamics of Atmospheric Reentry", Frank J. Regan, AIAA Education Series, the ballistic coefficient is calculated in accordance with expression (4):

$$\beta_m = \frac{m}{C_{D0}S}, \quad (4)$$

where $C_{D0}$ is the zero lift drag coefficient.

The maximum lift-drag ratio is calculated in accordance with expression (5):

$$L/D_{max} = \frac{C_L^*}{C_D^*}, \quad (5)$$

where $C_L^*$ is the lift coefficient for the case where the lift-drag ratio is maximum, and $C_D^*$ is the drag coefficient for the case where the lift-drag ratio is maximum.

According to "Dynamics of Atmospheric Reentry", Frank J. Regan, AIAA Education Series, the drag coefficient for the case where the lift-drag ratio is maximum is approximately represented, using the zero lift drag coefficient, by expression (6):

$$C_D^* = 2C_{Do}. \quad (6)$$

The lift force 570 for the case where the lift-drag ratio is maximum can be calculated in accordance with expression (7), which is acquired by substituting expressions (4) to (6) for expression (3):

$$L = m\rho V^2/D_{max}\beta_m^{-1}. \quad (7)$$

The first cosmic velocity 730 is calculated by expression (8):

$$V_e = \sqrt{gR_e}. \quad (8)$$

Expression (9) is acquired by substituting expression (8) for expression (2) as follows:

$$L = \left|\frac{mV_e^2}{R_e} - \frac{mV^2}{R_e}\right|. \quad (9)$$

According to "Dynamics of Atmospheric Reentry", Frank J. Regan, AIAA Education Series, the air density is calculated by expression (10):

$$\rho = \rho_0 e^{-\frac{h}{H_e}}. \quad (10)$$

Expression (11) is acquired by substituting expressions (9) and (10) for expression (7) as follows:

$$m\rho_0 e^{-\frac{h}{H_e V^2}} L/D_{max}\beta_m^{-1} = \left|\frac{mV_e^2}{R_e} - \frac{mV^2}{R_e}\right|. \quad (11)$$

Expression (12) is acquired by rewriting expression (11) as follows:

$$h = H_e \ln\left(\frac{\rho_0 R_e}{\beta_m} L/D_{max} \left|\frac{V^2}{V_e^2 - V^2}\right|\right). \quad (12)$$

Expression (12) represents an equilibrium altitude at which the lift force 570 and the centrifugal force 550 are balanced in the vertical direction for the current velocity. Accordingly, the reference altitude is set to an altitude lower than the equilibrium altitude determined in accordance with expression (12). Expression (1) is acquired by multiplying the right side of expression (12) by a correction factor K smaller than one, which aims at achieving a stable flight of the glide vehicle 200. The reference altitude may be calculated by expression (13), in which a desired value α is subtracted from the right side of expression (12):

$$h = H_e \ln\left(\frac{\rho_0 R_e}{\beta_m} L/D_{max} \left|\frac{V^2}{V_e^2 - V^2}\right|\right) - \alpha. \quad (13)$$

In such embodiments, a lower limit value may be defined since the reference altitude may be calculated as zero or below for reduced velocities. The reference altitude may be determined as the lower limit value when the calculated reference altitude is lower than the lower limit value.

Correction Factor

The correction factor K may be in a desired range. The flying distance of the glide vehicle 200 decreases as the correction factor K decreases. For example, the correction factor K may be larger than 0.7. The correction factor K may be larger than or equal to 0.8. The correction factor K may be larger than 0.8. When the correction factor K is increased, the altitude of the flying body 100 may exceed the equilibrium altitude at which the lift force 570 and the centrifugal force 550 are balanced in the vertical direction. The correction factor K may be smaller than or equal to 0.95. The correction factor K may be smaller than 0.95. The correction factor K may be smaller than or equal to 0.9. The correction factor K may be smaller than 0.9.

Figure 15:
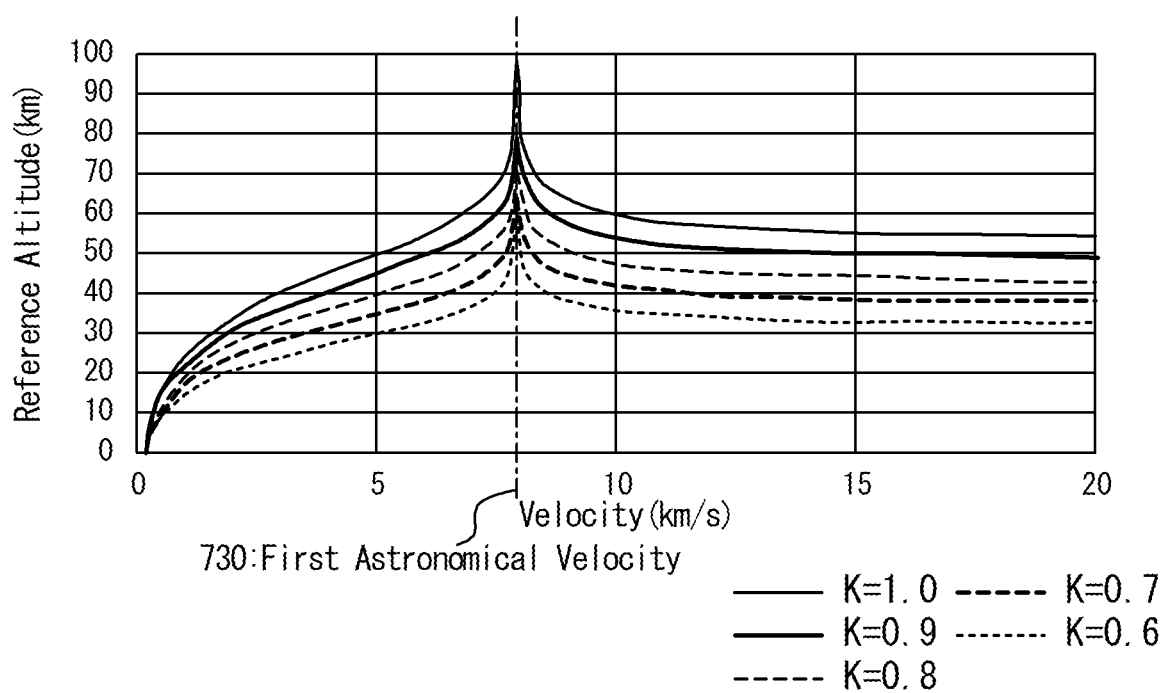
FIG. 15 is a graph illustrating a relation between the velocity of a glide vehicle and the reference altitude, the relation depending on a correction factor, according to one embodiment.

The correction factor K may be determined based on the altitude upper limit value 700. As illustrated in FIG. 15, the reference altitude increases as the correction factor K increases. Accordingly, the probability that the altitude of the flying body 100 exceeds the equilibrium altitude increases as the correction factor K increases.

Figure 16:
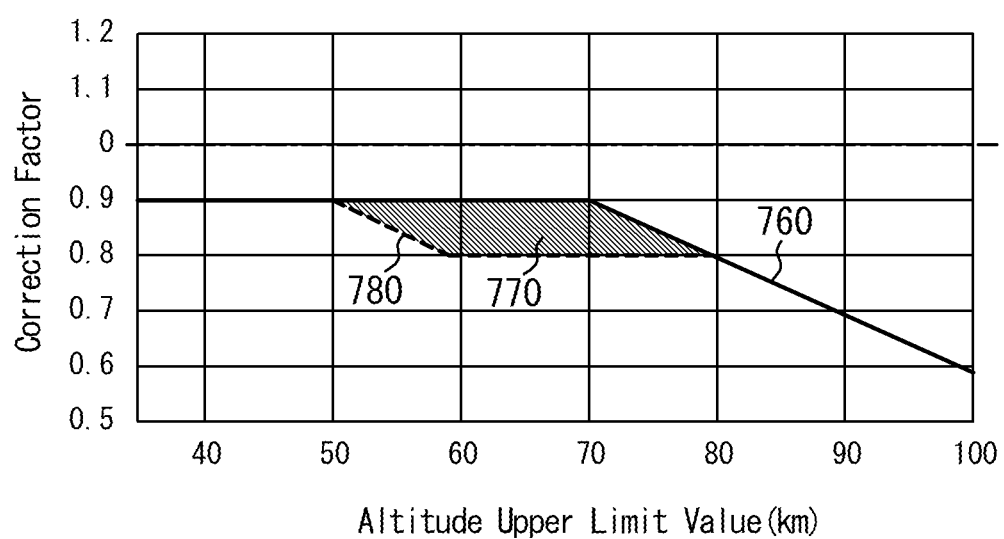
FIG. 16 is a graph illustrating a relation between a correction factor and an altitude upper limit value, according to one embodiment.

As illustrated in FIG. 16, the upper limit value 760 of the correction factor K may be determined based on the altitude upper limit value 700. The upper limit value 760 of the correction factor K may weakly monotonically decreases against the altitude upper limit value 700. In embodiments where the altitude upper limit value 700 is larger than 70 km, for example, the upper limit value 760 of the correction factor K may decrease as the altitude upper limit value 700 increases. The altitude of the flying body 100 may exceed the equilibrium altitude when the altitude upper limit value 700 is larger than 70 km and the correction factor K is 0.9. In embodiments where the altitude upper limit value 700 is larger than 70 km, for example, the function that represents the correlation of the upper limit value 760 of the correction factor K with the altitude upper limit value 700 may be a linear function.

The correction factor K may be in a range 770 in which the flying body 100 can fly stably with high efficiency. The correction factor K which falls in the range 770 may be smaller than or equal to the upper limit value 760 of the correction factor K determined based on the altitude upper limit value 700. The correction factor K which falls in the range 770 may be larger than 0.8. The flying body 100 can fly with high efficiency when the correction factor K is small and the altitude upper limit value 700 is large. In embodiments where the altitude upper limit value 700 is in a range from 50 km to 60 km, for example, the lower limit value 780 of the correction factor K which falls in the range 770 may be determined based on the altitude upper limit value 700. In embodiments where the altitude upper limit value 700 is in a range from 50 km to 60 km, the lower limit value 780 of the correction factor K may decrease as the altitude upper limit value 700 increases. In embodiments where the altitude upper limit value 700 is in a range from 50 km to 60 km, the function that represents the correlation of the lower limit value 780 of the correction factor K with the altitude upper limit value 700 may be a linear function.

Modification Examples

The flying body 100 may be ejected from a moving object, such as an aircraft. In such embodiments, the flying body 100 ejected from the aircraft may be configured to release the glide vehicle 200 in the atmosphere, for example, in the mesosphere.

Figure 10:
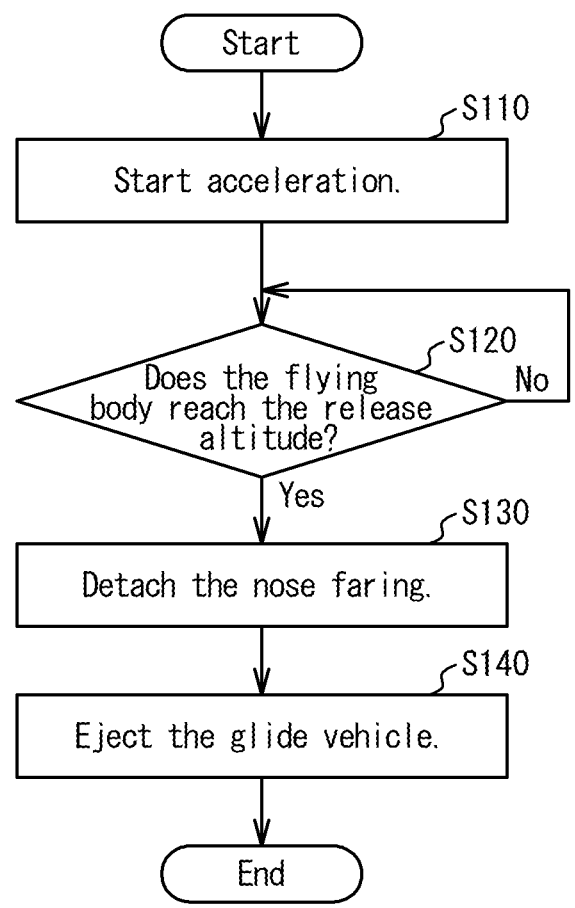
FIG. 10 is a flowchart illustrating a process performed in accordance with a flight program, according to one embodiment.

In the procedure illustrated in FIG. 10, the nose faring 120 may be detached before the flying body 100 reaches the releasing altitude. The nose faring 120, which is required only to protect the glide vehicle 200 from the dynamic pressure and raindrops, may be detached when the flying body 100 reaches an altitude at which the effect of the atmospheric air is small.

The flight control device 112 may be configured to acquire the location, velocity, and altitude of the flying body 100 from the inertial measurement unit 210 of the glide vehicle 200. In such embodiments, the inertial measurement unit 111 of the booster 110 may be omitted.

The flight program 300 may be executed by the processor 224 of the glide vehicle 200. In such embodiments, the processor 224 of the glide vehicle 200 may be configured to control the propulsion device 113 and the release device 114.

Figure 17:
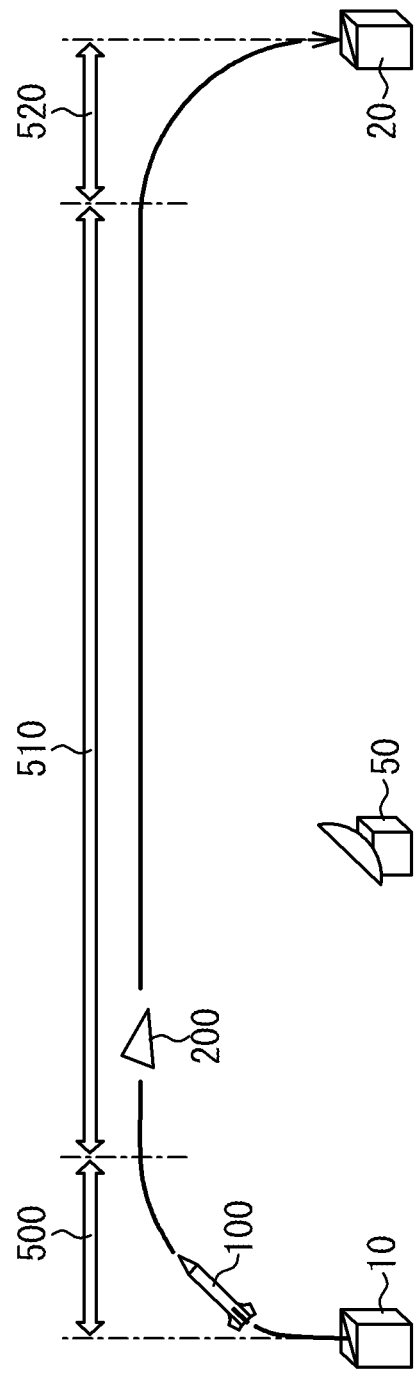
FIG. 17 is a diagram illustrating an overview of a movement of a glide vehicle toward a target, according to one embodiment.

The processor 224 of the glide vehicle 200 may be configured to acquire the altitude and velocity of the glide vehicle 200 from an entity external to the glide vehicle 200. For example, as illustrated in FIG. 17, a detect device 50 (e.g., a radar device) may be configured to detect the glide vehicle 200 and measure the altitude and velocity of the glide vehicle 200. In such embodiments, the detect device 50 may be configured to send the measured altitude and velocity to the glide vehicle 200. The inertial measurement unit 210 may be configured to repeatedly receive a GPS signal to calculate the altitude and velocity. The velocity may be calculated based on the history of positional information included in the GPS signal.

The release altitude may be an altitude out of the atmosphere, for example, an altitude higher than 100 km. When the releasing altitude is an altitude out of the atmosphere, the flying direction of the flying body 100 may be tilted downward with respect to the horizontal direction 610 at the release altitude.

The above-described embodiments and modification examples are mere examples and may be modified as long as their functionalities are maintained. The configurations presented in the embodiments and the modification examples may be arbitrarily modified and/or combined as long as their functionalities are maintained.

The glide control devices set forth in the above-described embodiments are represented, for example, as follows.

In a first aspect, a glide control device includes a communications device and a processor. The processor is configured to control an attitude control device to generate a downward lift force when a velocity of the glide vehicle is higher than or equal to the first cosmic velocity.

The glide control device thus configured allows the glide vehicle to reach a target in a short time since the glide vehicle can fly at a velocity higher than or equal to the first cosmic velocity in the atmosphere.

In a second aspect, the glide control device in the first aspect is configured such that the processor determines, based on the velocity of the glide vehicle, a reference altitude at which the glide vehicle should glide and controls the attitude control device based on a current altitude of the glide vehicle and the reference altitude.

The glide control device thus configured can control the attitude of the glide vehicle based on the altitude, thereby suppressing a decrease in the flying distance of the glide vehicle caused by an unnecessary deceleration.

In a third aspect, the glide control device in the second aspect is configured such that the reference altitude is determined such that a gravity, a lift force, and a centrifugal force which are exerted on the glide vehicle are balanced in a gravity direction.

In a fourth aspect, the glide control device in the second aspect is configured such that the reference altitude is calculated in accordance with the above-described expression (1).

In a fifth aspect, the glide control device in the second aspect is configured such that an altitude upper limit value is defined for the reference altitude.

This allows the glide vehicle to stably glide at velocities near the first cosmic velocity.

In a sixth aspect, a glide vehicle includes the above-described glide control device and the above-described attitude control device.

In a seventh aspect, the glide vehicle in the sixth aspect lacks a propulsion device configured to accelerate the glide vehicle.

In an eight aspect, a flying body includes: the glide vehicle in the seventh aspect; a propulsion device configured to accelerate the glide vehicle; and a flight control device. The flight control device is configured to control the propulsion device to achieve a level flight at a release altitude. The flight control device is further configured to release the glide vehicle at the release altitude.

In a ninth aspect, the flying body in the eighth aspect is configured such that the flight control device controls the propulsion device such that a flying direction of the flying body is tilted downward with respect to a horizontal direction at the release altitude when the release altitude is an altitude out of the atmosphere.

In a tenth aspect, the flying body in the eighth aspect is configured such that the release altitude is an altitude in the atmosphere at which aerodynamic steering is achievable.

The flying body thus configured allows the glide vehicle to reach a target in a short time as the glide vehicle is released in the atmosphere.

In an eleventh aspect, the flying body in the eighth aspect is configured such that the release altitude includes a reference altitude at which the glide vehicle should glide.

The flying body thus configured allows the glide vehicle to reach a target in a short time as the glide vehicle can reach the reference altitude without largely changing the altitude.

In a twelfth aspect, the flying body in the eight aspect is configured such that the flight control device controls the propulsion device to allow the flying body to have a velocity higher than or equal to the first cosmic velocity at the release altitude.

In a thirteen aspect, a non-transitory tangible storage medium stores a program which when executed causes a processor to execute a reference altitude calculation module and an attack angle control module. The reference altitude calculation module causes the processor to calculate, based on a velocity of a glide vehicle, a reference altitude at which the glide vehicle should glide. The attack angle control module causes the processor to generate, based on the reference altitude, a glide control signal that controls an attitude of the glide vehicle. The attack angle control module causes the processor to generate the glide control signal to produce a downward lift force when the velocity is higher than or equal to a first cosmic velocity.

What is claimed is:

1. A glide control device, comprising:
    a communications device configured to communicate with an attitude control device of a glide vehicle in which no propulsion device configured to accelerate the glide vehicle is disposed; and
    a processor configured to control the attitude control device,
    wherein the processor is configured to control the attitude control device to generate a downward lift force so as to allow the glide vehicle to fly in a horizontal direction when a velocity of the glide vehicle is higher than or equal to a first cosmic velocity, and
    wherein the first cosmic velocity is a velocity required by a spacecraft in a circular low Earth orbit, and
    wherein the processor is configured to:
    determine, based on the velocity of the glide vehicle, a reference altitude at which the glide vehicle should glide; and
    control the attitude control device based on a current altitude of the glide vehicle and the reference altitude, wherein the reference altitude is calculated in accordance with the following expression (1):

$$h = KH_e \ln\left(\frac{\rho_0 R_e}{\beta_m} L/D_{max} \left|\frac{V^2}{V_e^2 - V^2}\right|\right), \quad (1)$$

wherein h is the reference altitude,
    K is a correction factor,
    $H_e$ is a scale height of the earth used to calculate a density of atmospheric air,
    $\rho_0$ is an air density at an altitude of 0 m,
    $R_e$ is an earth radius,
    $\beta_m$ is a ballistic coefficient,
    $V_e$ is the first cosmic velocity, and
    $L/D_{max}$ is a maximum lift-drag ratio of the glide vehicle.

2. The glide control device according to claim 1, wherein the reference altitude is determined such that a gravity exerted on the glide vehicle by the earth, a lift force, and a centrifugal force are balanced in a vertical direction.

3. The glide control device according to claim 1, wherein an altitude upper limit value is defined for the reference altitude.

4. The glide control device according to claim 1, wherein the first cosmic velocity is calculated in accordance with the following expression (8):

$$V_e = \sqrt{gR_e}. \quad (8)$$

where Ve is the first cosmic velocity,
    g is the acceleration of gravity, and
    Re is an Earth radius.

5. A glide vehicle, comprising:
    an attitude control device; and
    a glide control device, the glide control device comprising:
        a communications device configured to communicate with the attitude control device of the glide vehicle in which no propulsion device configured to accelerate the glide vehicle is disposed; and
        a processor configured to control the attitude control device,
    wherein the processor is configured to control the attitude control device to generate a downward lift force so as to allow the glide vehicle to fly in a horizontal direction when a velocity of the glide vehicle is higher than or equal to a first cosmic velocity, and wherein the first cosmic velocity is a velocity required by a spacecraft in a circular low Earth orbit, and wherein the processor is configured to:

determine, based on the velocity of the glide vehicle, a reference altitude at which the glide vehicle should glide; and control the attitude control device based on a current altitude of the glide vehicle and the reference altitude, wherein the reference altitude is calculated in accordance with the following expression (1):

$$h = KH_e \ln\left(\frac{\rho_0 R_e}{\beta_m} L/D_{max} \left|\frac{V^2}{V_e^2 - V^2}\right|\right), \quad (1)$$

wherein h is the reference altitude,
K is a correction factor,
$H_e$ is a scale height of the earth used to calculate a density of atmospheric air,
$\rho_0$ is an air density at an altitude of 0 m,
$R_e$ is an earth radius,
$\beta_m$ is a ballistic coefficient,
$V_e$ is the first cosmic velocity, and
$L/D_{max}$ is a maximum lift-drag ratio of the glide vehicle.

6. The glide vehicle according to claim 5, wherein the first cosmic velocity is
calculated in accordance with the following expression (8):

$$V_e = \sqrt{gR_e}. \quad (8)$$

where Ve is the first cosmic velocity,
g is the acceleration of gravity, and
Re is an Earth radius.

7. A flying body, comprising:
an attitude control device; and
a glide control device comprising:
  a communications device configured to communicate with the attitude control device of a glide vehicle in which no propulsion device configured to accelerate the glide vehicle is disposed; and
  a processor configured to control the attitude control device to generate a downward lift force so as to allow the glide vehicle to fly in a horizontal direction when a velocity of the glide vehicle is higher than or equal to a first cosmic velocity, which is a velocity required by a spacecraft in a circular low Earth orbit;
a propulsion device configured to accelerate the glide vehicle; and
a flight control device configured to:
  control the propulsion device to achieve a level flight at a release altitude; and
release the glide vehicle at the release altitude, and
wherein the processor is configured to:
determine, based on the velocity of the glide vehicle, a reference altitude at which the glide vehicle should glide; and
control the attitude control device based on a current altitude of the glide vehicle and the reference altitude, wherein the reference altitude is calculated in accordance with the following expression (1):

$$h = KH_e \ln\left(\frac{\rho_0 R_e}{\beta_m} L/D_{max} \left|\frac{V^2}{V_e^2 - V^2}\right|\right), \quad (1)$$

wherein h is the reference altitude,
K is a correction factor,
$H_e$ is a scale height of the earth used to calculate a density of atmospheric air,
$\rho_0$ is an air density at an altitude of 0 m,
$R_e$ is an earth radius,
$\beta_m$ is a ballistic coefficient,
$V_e$ is the first cosmic velocity, and
$L/D_{max}$ is a maximum lift-drag ratio of the glide vehicle.

8. The flying body according to claim 7, wherein the flight control device is configured to control the propulsion device such that a flying direction of the flying body is tilted downward with respect to a horizontal direction at the release altitude when the release altitude is an altitude out of the atmosphere.

9. The flying body according to claim 7, wherein the release altitude is an altitude in the atmosphere at which aerodynamic steering is achievable.

10. The flying body according to claim 7, wherein the release altitude comprises a reference altitude at which the glide vehicle should glide.

11. The flying body according to claim 7, wherein the flight control device is configured to control the propulsion device such that the flying body has a velocity higher than or equal to the first cosmic velocity at the release altitude.

12. The flying body accordingly to claim 7, wherein the first cosmic velocity is
calculated in accordance with the following expression (8):

$$V_e = \sqrt{gR_e}. \quad (8)$$

where Ve is the first cosmic velocity,
g is the acceleration of gravity, and
Re is an Earth radius.

13. A non-transitory tangible storage medium storing a program which when executed causes a processor to implement steps of:
calculating, based on a velocity of a glide vehicle in which no propulsion device configured to accelerate the glide vehicle is disposed, a reference altitude at which the glide vehicle should glide; and
generating a glide control signal that controls an attitude of the glide vehicle based on the reference altitude,
wherein generating the glide control signal comprises:
generating the glide control signal to produce a downward lift force so as to allow the glide vehicle to fly in a horizontal direction when the velocity is higher than or equal to a first cosmic velocity, which is a velocity required by a spacecraft in a circular low Earth orbit,
determining, based on the velocity of the glide vehicle, a reference altitude at which the glide vehicle should glide; and
controlling the attitude based on a current altitude of the glide vehicle and the reference altitude, wherein the reference altitude is calculated in accordance with the following expression (1):

$$h = KH_e \ln\left(\frac{\rho_0 R_e}{\beta_m} L/D_{max} \left|\frac{V^2}{V_e^2 - V^2}\right|\right), \quad (1)$$

wherein h is the reference altitude,
K is a correction factor,
$H_e$ is a scale height of the earth used to calculate a density of atmospheric air,
$\rho_0$ is an air density at an altitude of 0 m, $R_e$ is an earth radius,
$\beta_m$ is a ballistic coefficient,
$V_e$ is the first cosmic velocity, and
$L/D_{max}$ is a maximum lift-drag ratio of the glide vehicle.

14. The non-transitory tangible storage medium according to claim 13, wherein the first cosmic velocity is calculated in accordance with the following expression (8):

$$V_e = \sqrt{gR_e}. \quad (8)$$

where Ve is the first cosmic velocity,
g is the acceleration of gravity, and
Re is an Earth radius.

* * * * *